May 1, 1962 G. F. WILSON 3,031,712
BUTTER SPREADER
Filed Sept. 12, 1960
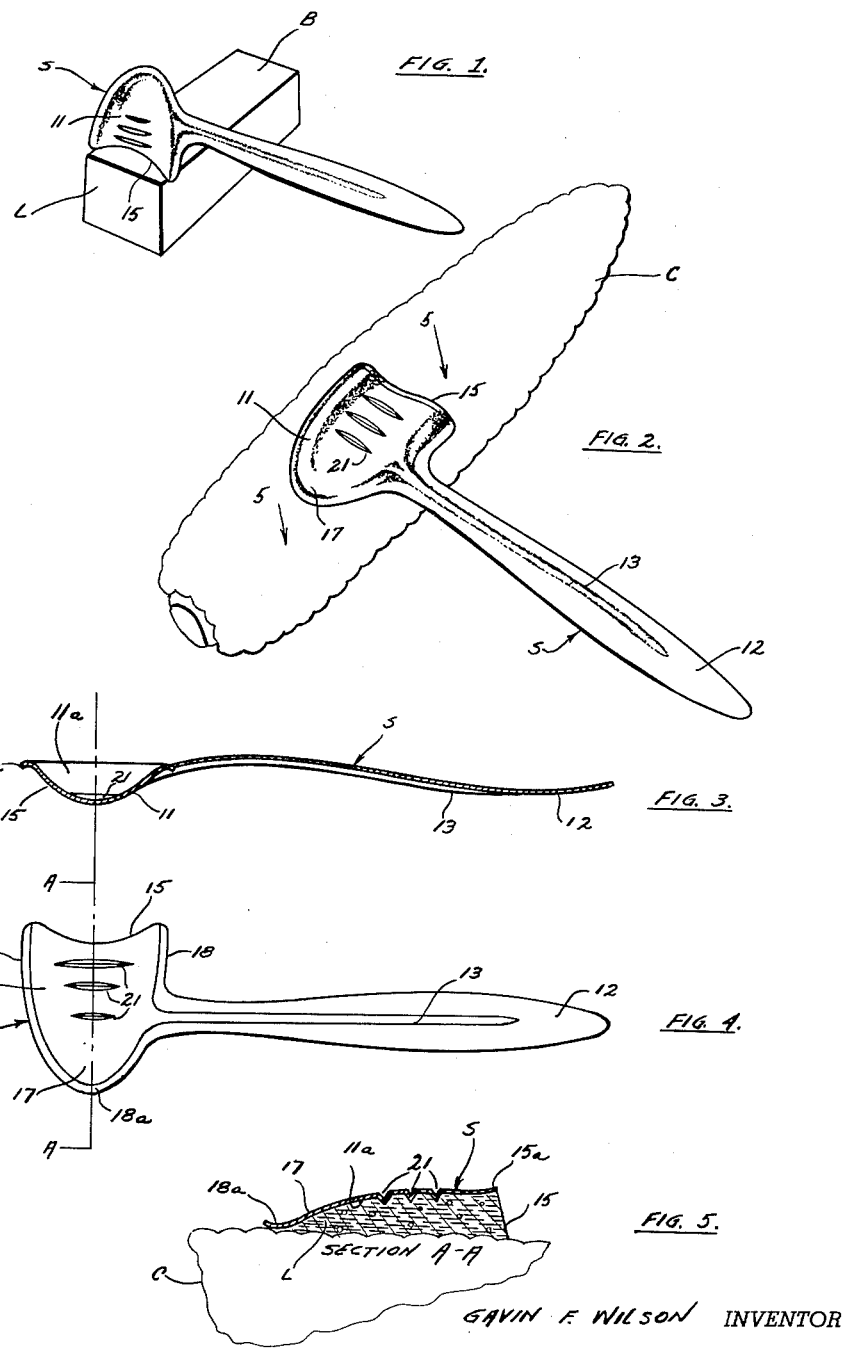
GAVIN F. WILSON INVENTOR
BY George W Talbutt
ATTORNEY

United States Patent Office 3,031,712
Patented May 1, 1962

3,031,712
BUTTER SPREADER
Gavin F. Wilson, 16680 Eastburn St., Detroit, Mich.
Filed Sept. 12, 1960, Ser. No. 55,459
4 Claims. (Cl. 15—514)

This invention relates to a butter spreader particularly adapted for buttering corn on the cob.

It is a primary object of this invention to provide a butter spreader that is simple in construction, efficient in operation, and adapted to be styled to conform to the patterns of table service utensils with which the spreader may form a part.

It is another object of this invention to provide a butter spreader particularly adapted for buttering corn on the cob with the spreader having a blade portion of dished, spoon-shaped, configuration that is arranged to cut a lump of butter from a butter block, retain the butter lump in the dished blade concavity during spreading while directly applying one surface of the butter lump to the hot corn cob exterior so as to spread melted butter over the corn surface with maximum ease and efficiency.

It is still another object of this invention to shape the periphery of the dished, spoon-shaped, spreader blade with rolled edges such that the blade may be readily reciprocated across the corn cob surface without danger of the blade edges digging into the corn kernels.

It is still another object of this invention to provide a butter spreader for buttering corn on the cob that is arranged to apply an even butter film to the corn kernels in the easiest, most efficient manner without any danger of loss of the butter lump during the buttering operation and without the danger of or need for actual touching of the butter with the fingers of the spreader user.

Other objects and advantages of this invention will become readily apparent from a reading of the following description and a consideration of the related drawings wherein:

FIG. 1 is a perspective view of this novel butter spreader cutting a lump of butter from a butter block or stick;

FIG. 2 is a perspective view of the novel butter spreader of FIG. 1 applying butter to the exterior surface of a cob of corn;

FIG. 3 is a side elevational view of the butter spreader embodying this invention;

FIG. 4 is a top plan elevational view of the butter spreader shown in FIG. 3; and FIG. 5 is a fragmentary sectional elevational view taken along the line 5—5 of FIG. 2.

As can be seen from the drawing figures the butter spreader S embodying this invention comprises a dished, spoon-shaped blade portion 11 that is supported on a handle 12. The handle 12 may have a stiffening rib 13 extending longitudinally thereof. The blade portion 11 of the spreader S embodies the specific structure that provides the several advantages of this spreader over prior devices of this type. It will be noted that the spreader blade 11 is of a dished spoon-shape. The dished spoon-shaped blade 11 has a front or mouth edge 15 that is rolled over outwardly as indicated at 15a in FIG. 5. The blade 11 is of maximum depth at the mouth end 15 and tapers down in depth towards the closed rear end 17. It will be noted that the periphery 18 of the spoon-shaped blade portion 11 is, like the mouth edge 15, provided with a rolled over, outwardly directed edge as clearly shown at 18a in FIG. 5. It is thought to be clear from FIG. 5 that the rolled over edges 15a and 18a provide arcuate sliding skids for the blade 11 as the spreader S is reciprocated across the corn cob C.

To facilitate the retention of the lump of butter L by the dished, spoon-shaped blade 11, the concave inner face 11a of the blade 11 is provided with a plurality of transversely extending ribs 21. These ribs 21 may be formed as inwardly extending indentations in the blade material.

From the foregoing description of this spreader S it is thought to be obvious how the spreader can be turned on end, as shown in FIG. 1, for use as a knife to cut a lump of butter-like material L from a block B. The spreader mouth edge 15, even though it may be rolled over as shown at 15a in FIG. 5, still will function as a knife blade for severing a lump of butter-like material L from the block B. Because of the dished, tapered, spoon-like shape of the spreader blade 11, when the blade 11 is passed downwardly through the block B, a lump L is deposited in the blade concavity 11a that completely fills the blade concavity 11a. Due to the fact that the blade 11 has transverse ribs 21 on its concave face 11a, the butter lump L is formed about the ribs 21 during the severing of the lump L from the block B. This engagement of the lump L with the blade ribs 21, tends to anchor the lump L in the tapered blade concavity 11a so that it will not be dislodged during reciprocation of the spreader S across a surface to be coated by the lump L. As the butter-like material L melts and flows across the food surface to be coated, a lubricant is provided that cooperates with the rolled over blade edges 15a, 18a that act as blade supporting skids. While spreaders of the disclosed type have been made of thin metal by a simple one-step, stamping operation that is economically attractive, still, it is also possible to economically produce the spreader S from a plastic material by a simple casting or die forming operation. It has also been found advantageous to use materials for the spreader S that are slightly flexible or resilient so that the blade 11 will tend to conform to the varying shapes or curvature of the food item to which the spreader S is applied.

I claim:

1. A spreader for applying a butter-like coating to a food such as corn on the cob comprising an elongated blade of dished, spoon-shaped, configuration shaped to retain a lump of butter-like material between its concave face and the surface of the food to which the butter-like coating is to be applied and a handle connected to and extending transversely of the blade, said blade having a truncated end portion providing a knife edge to sever a lump of butter-like material from a mass thereof and at least the side edge portions of the blade periphery provided with rolled-over, outwardly directed edges that are adapted to skid along the surface of the food item during reciprocation of the spreader therealong in a coating operation.

2. A spreader for applying a butter-like coating to a food such as corn on the cob comprising an elongated blade of dished, spoon-shaped configuration shaped to retain a lump of butter-like material between its concave face and the surface of the food to which the butter-like coating is to be applied and a handle connected to and extending transversely of the blade, said blade having inwardly extending rib means on the concave face thereof to facilitate retention of a lump of butter-like material in the blade concavity during a spreading operation, said blade having a truncated end portion providing a knife edge to sever a lump of butter-like material from a mass thereof and at least the side edge portions of the blade periphery provided with rolled-over, outwardly directed edges that are adapted to skid along the surface of the food item during reciprocation of the spreader therealong in a coating operation.

3. A spreader for applying a butter-like coating to a food such as corn on the cob comprising an elongated blade of dished, spoon-shaped, configuration shaped to retain a lump of butter-like material between its concave face and the surface of the food to which the butter-like coating is to be applied and a handle connected to and extending transversely of the blade, said blade having inwardly extending rib means on the concave face thereof to facilitate retention of a lump of butter-like material in the blade concavity during a spreading operation, said blade having a truncated end portion providing a knife edge to sever a lump of butter-like material from a mass thereof and at least the side edge portions of the blade periphery provided with rolled-over, outwardly directed edges that are adapted to skid along the surface of the food item during reciprocation of the spreader therealong in a coating operation, said blade concavity being of maximum depth at one end and tapering down towards the opposite end.

4. A spreader as set forth in claim 1 wherein the blade portion is made from a flexible resilient material.

References Cited in the file of this patent
UNITED STATES PATENTS

| | | |
|---|---|---|
| 2,565,874 | Mossel | Aug. 28, 1951 |
| 2,714,295 | Shick | Aug. 2, 1955 |
| 2,750,767 | Knauf | June 19, 1956 |